ially monitoring and controlling the blanking (black) current level of an image reproducing kinescope having cathode and grid intensity control electrodes. When cathode blanking current is monitored, a reference voltage is applied to the cathode over the entire monitoring interval, and an auxiliary voltage is applied to the grid electrode during a portion of the monitoring interval. A version of the grid voltage appears as an induced cathode output voltage proportional to the level of cathode blanking current conduction. A voltage responsive sensing network coupled to the cathode provides an output voltage proportional to the difference in cathode current conducted over the monitoring interval. This voltage is processed by a sampling network to produce a control voltage for modifying the cathode bias in a direction to produce the desired cathode blanking current level at or in the vicinity of kinescope cut-off. The sampling network includes two similar time sequential sample and hold circuits. The first circuit samples the induced cathode output voltage, and the second circuit subsequently samples the cathode reference voltage. The sampled voltages are differentially processed to remove unwanted common mode interference signals from the control voltage.

United States Patent [19]

Hinn

[11] 4,277,798
[45] Jul. 7, 1981

[54] AUTOMATIC KINESCOPE BIASING SYSTEM WITH INCREASED INTERFERENCE IMMUNITY

[75] Inventor: Werner Hinn, Zollikerberg, Switzerland

[73] Assignee: RCA Corporation, New York, N.Y.

[21] Appl. No.: 134,656

[22] Filed: Mar. 27, 1980

[30] Foreign Application Priority Data

Apr. 18, 1979 [GB] United Kingdom ............... 13423/79

[51] Int. Cl.³ ........................................... H04N 9/535
[52] U.S. Cl. ..................................... 358/33; 358/34; 358/165
[58] Field of Search ....................... 358/33, 29, 21, 34, 358/74, 165, 171, 243

[56] References Cited

U.S. PATENT DOCUMENTS 3,558,817  1/1971  Van den Avoort et al.
4,012,775  3/1977  Smith ..................................... 358/29

Primary Examiner—Richard Murray
Attorney, Agent, or Firm—Eugene M. Whitacre; William H. Meagher; Ronald H. Kurdyla

[57] ABSTRACT

Apparatus is disclosed in a video signal processing sys-

11 Claims, 12 Drawing Figures

TIME →

AUTOMATIC KINESCOPE BIASING SYSTEM WITH INCREASED INTERFERENCE IMMUNITY

The invention relates to apparatus for automatically controlling the bias of an image reproducing kinescope in a video signal processing system such as a color television receiver or an equivalent system, in order to establish proper blanking current levels for each of the electron guns of the kinescope. In particular, this invention concerns an automatic kinescope bias control system of the type shown, for example, in my copending U.S. patent application Ser. No. 103,445 entitled "Automatic Kinescope Biasing System," with improved immunity to spurious interference signals which can adversely influence the operation of the system.

A color image reproducing kinescope included in a color television receiver comprises a plurality of electron guns each energized by red, green and blue color representative signals derived from a composite color television signal. Since a reproduced color image is defined by individual ones of these signals or a combination thereof, optimum reproduction of a color image requires that the relative proportions of these color signals be correct at all kinescope drive levels from white through gray to black, at which point the three electron guns should exhibit significantly reduced conduction or be cut-off.

The optimum reproduction of a color picture and gray scale tracking of the kinescope can be impaired when the bias of the electron guns varies from a predetermined level, causing unwanted kinescope cut-off errors to be produced. These errors are visible as a color tint on a displayed monochrome picture, and also upset the color fidelity of a displayed color image. The cut-off errors can be caused by a variety of factors, including variations in the operating characteristics of the kinescope and associated circuits (e.g., due to aging), temperature effects, and momentary kinescope "flashovers."

Since it is desirable to assure that the proportioning of the color signals to the kinescope is correct at all picture brightness levels, color television receivers commonly include provisions for adjusting the kinescope and associated circuits in a set-up or service operating mode of the receiver in accordance with well known procedures. Briefly, a service switch with "normal" and "service" positions is operatively associated with the receiver signal processing circuits and the kinescope. In the "service" position, video signals are decoupled from the kinescope and vertical scan is collapsed. The bias of each electron gun is then adjusted to establish a desired blanking current (e.g., a few microamperes) for each electron gun. This adjustment ensures that the kinescope is properly blanked in the absence of an applied video signal or in response to a black reference level of the video signal, and also ensures a proper proportion of color signals at all brightness levels. The kinescope driver circuits associated with each electron gun are then adjusted for a desired gain (e.g., to compensate for kinescope phosphor inefficiencies) to assure a proper proportion of red, green and blue signal drive when the receiver operates normally.

The kinescope blanking adjustment is time-consuming and inconvenient, and typically should be performed several times during the life of the kinescope. In addition, the kinescope blanking and gain adjustments often interact with each other, thereby requiring that successive adjustments be made. Therefore, it is advantageous to eliminate the need for this adjustment such as by having this adjustment performed automatically by circuits within the receiver.

Automatic kinescope bias control systems are known. The known systems typically measure the value of a very small cathode blanking current during an interval (e.g., occurring within a vertical image blanking interval of the television signal when picture information is absent) when a suitable (black) reference level signal is applied to an intensity control electrode of the kinescope. A derived control voltage is used to correct the biasing of a kinescope driver amplifier to produce a desired level of cathode blanking current. However, the known systems suffer from one or more disadvantages which are avoided by an arrangement according to the present invention.

Specifically, an automatic kinescope bias arrangement according to the present invention exhibits considerable immunity to interference signals from power supply and deflection networks of the receiver. Such interference signals primarily comprise unavoidable stray magnetic fields associated with power supply transformers, the kinescope deflection yoke assembly, and other circuit components capable of producing magnetic fields.

Also, the disclosed system does not require a high voltage transistor for sensing kinescope cathode blanking current. The disclosed system furthermore does not rely on the measurement of the absolute value of the very low cathode current in the vicinity of the kinescope cut-off, and is substantially insensitive to cathode leakage currents which could otherwise lead to objectionable kinescope bias correction errors.

In accordance with the invention, in a system for processing an image representative video signal having periodically recurring image display intervals and blanking intervals during which image information to be displayed is absent, the system including an image reproducing kinescope having an electron gun with cathode and grid intensity control electrodes, and a network for coupling video signals to the electron gun, apparatus is included for automatically controlling the level of blanking current conducted by the kinescope. A reference bias voltage is applied to the cathode electrode via a cathode current conduction path during a monitoring interval when the kinescope blanking current level is to be monitored. The monitoring interval encompasses a portion of the blanking interval. An auxiliary signal is applied to the grid electrode with a sense for forward biasing the grid electrode during one portion of the monitoring interval. A first network coupled to the cathode current path operates during the one portion of the monitoring interval for deriving a first signal proportional to the level of cathode current conducted in response to the auxiliary signal. A second network also coupled to the cathode current path operates during another portion of the monitoring interval for deriving a second signal proportional to the level of cathode current conducted during the other portion of the monitoring interval. A differential amplifier responds to the first and second derived signals for producing an output control signal. The control signal is proportional to the difference in magnitude between the first and second derived signals, and is thereby proportional to the difference between currents flowing in the cathode current path over the monitoring interval. The control signal is supplied to the video signal coupling network for modifying the kinescope bias in a direction to adjust the signal difference to a level corresponding to a desired kinescope bias condition.

In accordance with a feature of the invention, the first and second deriving networks comprise first and second sample and hold networks operative during respective intervals of substantially equal duration during the monitoring interval.

In accordance with another feature of the invention, inputs of the first and second deriving networks are coupled to the cathode current path via a voltage responsive sensing network, such as a voltage divider, with an input coupled to the cathode current path and an output coupled to the inputs of the first and second deriving networks.

Figure 1:
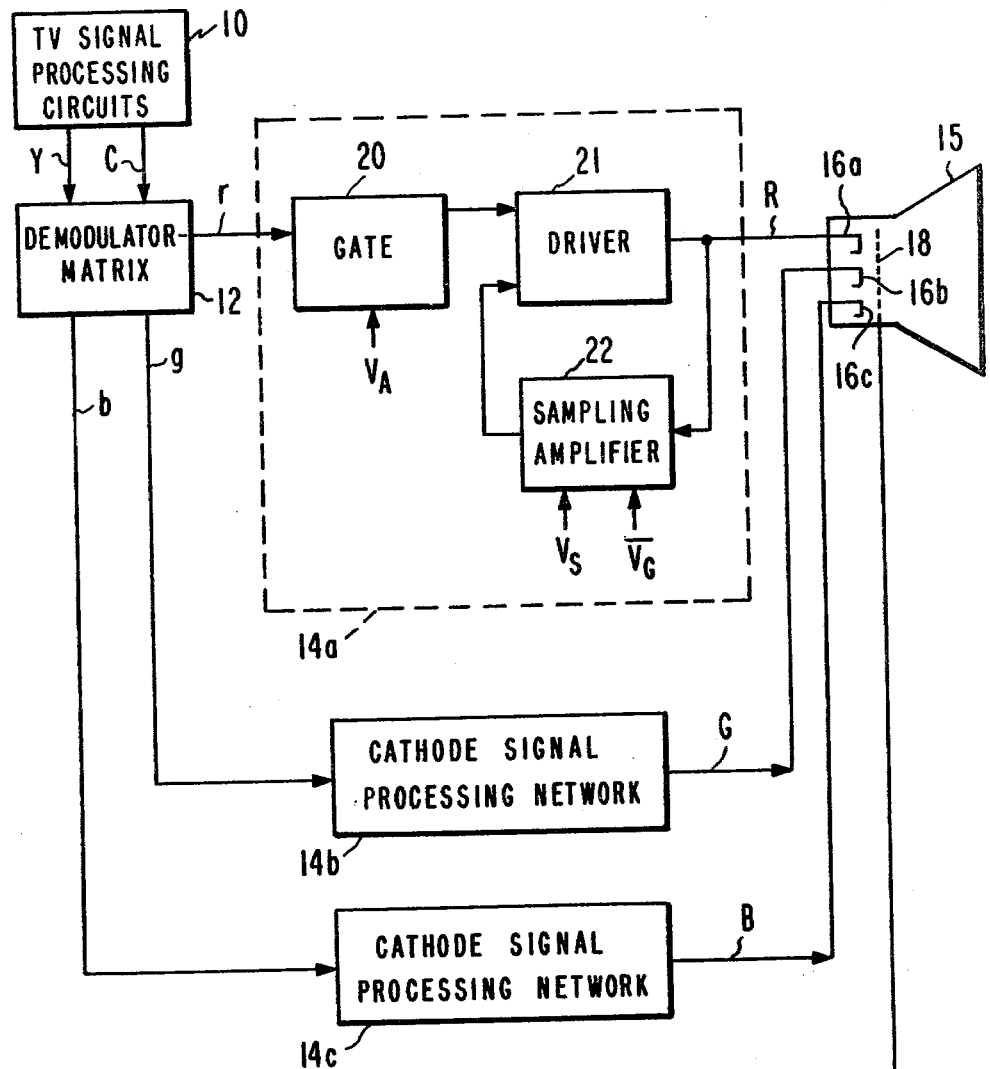
FIG. 1 illustrates a block diagram of a portion of a color television receiver including apparatus according to the present invention.
Figure 1:
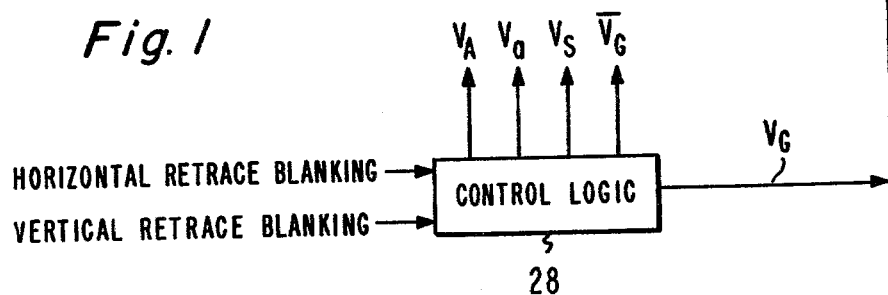

In FIG. 1, television signal processing circuits 10 (e.g., including video detector, amplifier and filter stages) provide separated luminance (Y) and chrominance (C) components of a composite color television signal to a demodulator-matrix 12. Matrix 12 provides output low level color image representative signals r, g and b. These signals are amplified and otherwise processed by circuits within cathode signal processing networks 14a, 14b and 14c, respectively, which supply high level amplified color image signals R, G and B to respective cathode intensity control electrodes 16a, 16b and 16c of a color kinescope 15. In this example, kinescope 15 is of the self-converging in-line gun type with a commonly energized grid 18 associated with each of the electron guns comprising cathode electrodes 16a, 16b and 16c.

Cathode signal processing networks 14a, 14b and 14c are similar in this embodiment. Therefore, the following discussion of the construction and operation of processing network 14a also applies to networks 14b and 14c.

In network 14a, a keyed gate 20 (e.g., an analog electronic switch) couples and decouples the r signal output from matrix 12 to a video signal input of a kinescope driver 21 in response to a keying signal $V_A$. Driver stage 21 includes a signal amplification network for developing high level output signal R which is applied to kinescope cathode 16a. Cathode 16a is coupled to an input of a sampling amplifier 22. Amplifier 22 is keyed by signals $V_S$ and $\overline{V_G}$ to produce an output control signal which is supplied to a bias control input of driver 21 for modifying the bias of the amplifier circuits within driver 21 to control the blanking or black level current conducted by cathode 16a, as will be discussed.

A control logic unit 28 is also included in the system of FIG. 1. Logic unit 28 responds to horizontal and vertical retrace blanking signals derived elsewhere in the receiver for generating keying signal $V_A$ for gate 20 and keying signals $\overline{V_G}$ and $V_S$ for sampling unit 22. Unit 28 also generates a keying signal $V_a$, and an output voltage pulse $V_G$ during an interval when the cathode blanking current of kinescope 15 is to be monitored. The output of unit 28 from which signal $V_G$ is provided also supplies an appropriate bias voltage for grid 18 (substantially zero volts in this example) at times other than the grid pulse interval.

Figure 2:
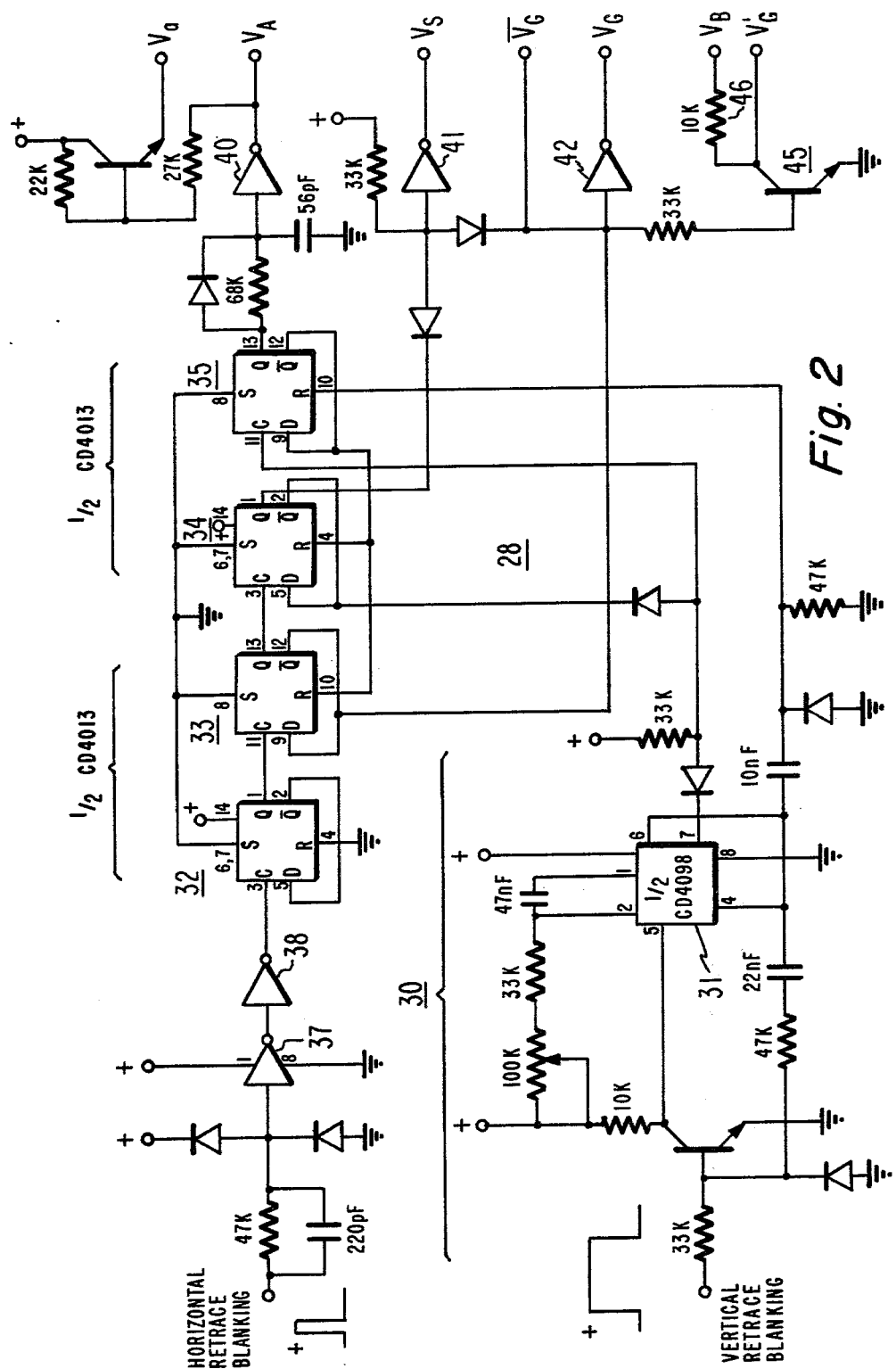
FIG. 2 shows a circuit arrangement of one portion of the apparatus shown in FIG. 1.

A circuit arrangement of logic control unit 28 is shown in FIG. 2. The circuit comprises a monostable ("one-shot") multivibrator network 30 including an active device 31 responsive to the leading edge of an input positive vertical retrace blanking pulse, and a plurality of flip-flop stages 32–35. Monostable circuit 30 supplies output timing signals to inputs of flip-flops 34 and 35. Each flip-flop stage includes inputs C and D, complementary outputs Q and $\overline{Q}$, and set (S) and reset (R) control inputs. Flip-flops 32–34 comprise a counter stage responsive to positive horizontal line retrace blanking pulses applied to the counter stage via an input circuit including inverters 37 and 38. Flip-flop 35 serves to reset the counter stage at the end of the cathode current monitoring interval. Circuit 28 also includes a plurality of output logic inverters 40–42. Flip-flops 32–35 can be of the type included in integrated circuit type CD4013, and inverters 37, 38 and 40–42 can be of the type included in integrated circuit type CD4049A. In this example, active device 31 in monostable multivibrator network 30 comprises a portion of integrated circuit type CD4098. All of the integrated circuit types mentioned above are available from the Solid State Division of RCA Corporation, Somerville, New Jersey.

FIGS. 3–8 illustrate the waveforms for the keying signals supplied by circuit 28, together with horizontal retrace blanking pulses, and the mutual timing relationship of these signals.

The kinescope cathode current monitoring interval occurs after the end of vertical retrace blanking, but before the beginning of the picture interval of the television signal containing picture information to be displayed. That is, the monitoring interval occurs during a portion of a larger time interval that encompasses several horizontal lines during which picture information is absent. The operation of monitoring the kinescope cathode blanking current produces no visible effects on a displayed picture since the kinescope is overscanned at this time (i.e., the kinescope electron beam is deflected to strike the face of the kinescope above the picture display area).

Figure 3:
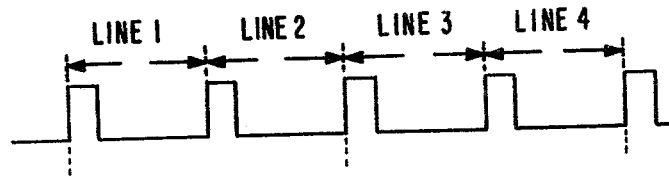
FIGS. 3–8 depict signal waveforms useful in understanding the operation of the apparatus shown in FIG. 1.
Figure 4:
Figure 5:
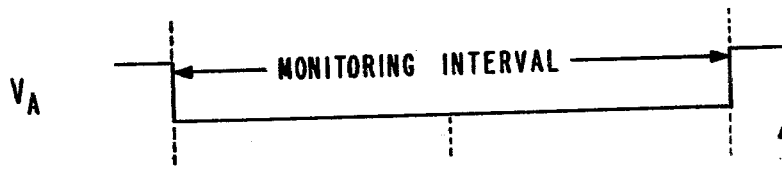
Figure 6:
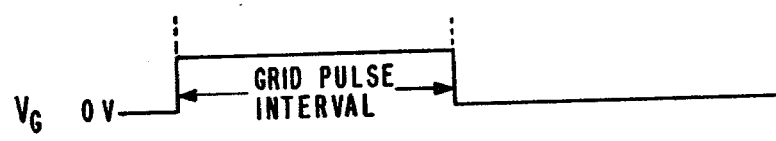
Figure 7:
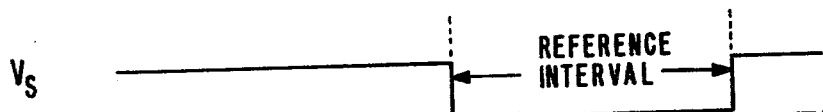
Figure 8:
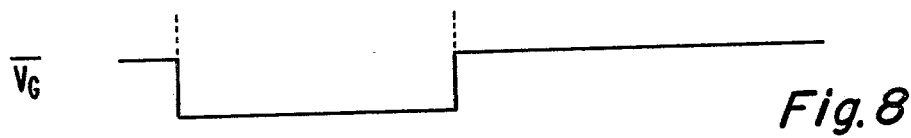

In this example, the monitoring interval encompasses the first four horizontal lines that occur after vertical retrace blanking ends. These four horizontal lines are represented by the waveform of FIG. 3, comprising periodic positive pulses at the line rate. However, these four horizontal lines over which monitoring occurs need not correspond to the first four lines after vertical retrace.

Signal $V_a$ (FIG. 4) and signal $V_A$ (FIG. 5) comprise negative-going pulses that occur over the monitoring interval encompassing lines one through four.

Signal $V_G$ (FIG. 6) comprises a positive pulse occurring over a grid pulse interval encompassing lines one and two of the monitoring interval. This pulse is applied to the kinescope grid during one portion of the monitoring interval. This pulse preferably exhibits a fixed positive amplitude within a range of +5 to +15 volts, with respect to a lower pulse pedestal level corresponding to a normal grid bias level of zero volts in this example.

Signal $\overline{V_G}$ (FIG. 8) is the complementary version of signal $V_G$. With regard to circuit 28 of FIG. 2, an amplitude controlled version of signal $V_G$, designated as output signal $V_G'$, is available as an option at the collector output of a transistor 45. The amplitude of signal $V_G'$ can be varied in accordance with the level of a DC voltage $V_B$ applied to the collector of transistor 45 via a resistor 46.

Signal $V_S$ (FIG. 7) comprises a negative-going pulse occurring over a reference interval encompassing lines three and four of the monitoring interval, and is timed to begin at the end of the grid pulse interval.

In accordance with the disclosed system, gate 20 is opened in response to keying signal $V_A$ to inhibit conduction of signal r from matrix 12 to driver 21. This occurs over the entire monitoring interval (lines one through four). Relatively low voltage positive pulse $V_G$ is supplied to kinescope control grid 18 during lines one and two of the monitoring interval, and the output of driver 21 and thereby cathode 16a are provided with a quiescent reference level determined by a biasing network within driver 21, over the entire monitoring interval including the grid pulse and reference intervals.

A voltage proportional to the difference in cathode currents conducted over the monitoring interval (i.e., between the grid pulse and reference intervals) is utilized to determine if the electron gun is properly blanked (i.e., conducting zero current or a predetermined very small blanking current), or conducting excessive blanking current. During the grid pulse interval, the kinescope functions as a cathode follower in response to grid pulse $V_G$, wherein a similarly phased version of grid pulse $V_G$ appears at the kinescope cathode electrode during the grid pulse interval. The amplitude of the cathode pulse so developed is proportional to the level of the cathode current conduction but is somewhat attenuated relative to grid pulse $V_G$ due to the relatively low forward transconductance of the kinescope electron gun grid drive characteristic. The amplitude of the cathode pulse is very small when the cathode blanking current is at the desired blanking level.

Under conditions of excessively high cathode blanking current, the difference voltage is processed by sampling amplifier 22, which is arranged to nullify interference signals that would otherwise impair the effectiveness of the kinescope bias control system. An output signal from sampling amplifier 22 is applied to the bias control input of driver 21 for modifying the D.C. (bias) operating point of driver 21 in a direction to develop a bias level at the output of driver 21 sufficient to produce the desired cathode blanking current level by closed loop action. Gate 20 returns to the closed position at the end of the monitoring interval (after the fourth line), thereby allowing color signals from the output of matrix 12 to be coupled to driver 21.

Figure 9:
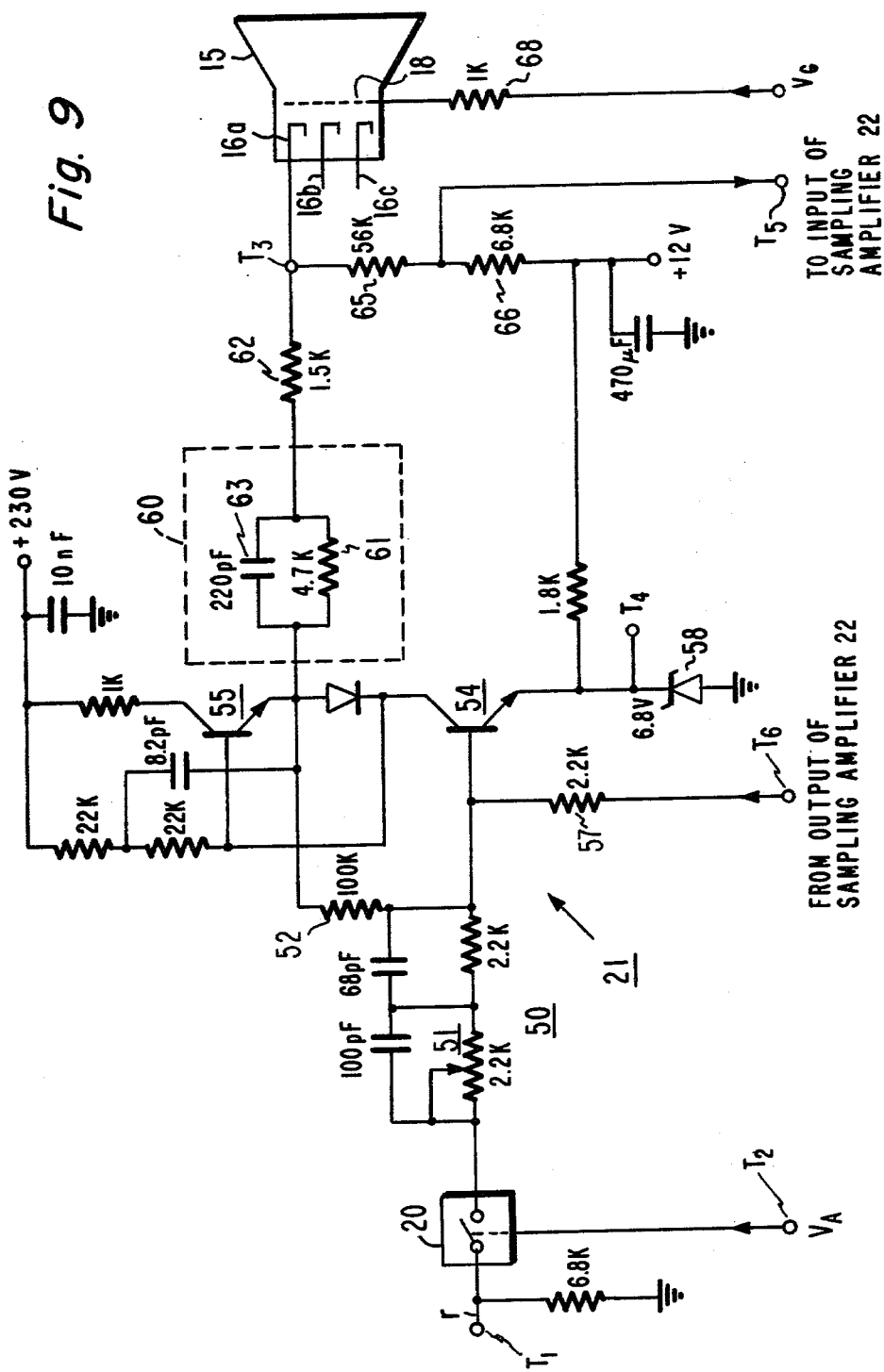
FIGS. 9 and 10 show circuit arrangements of other portions of the apparatus of FIG. 1.
Figure 10:
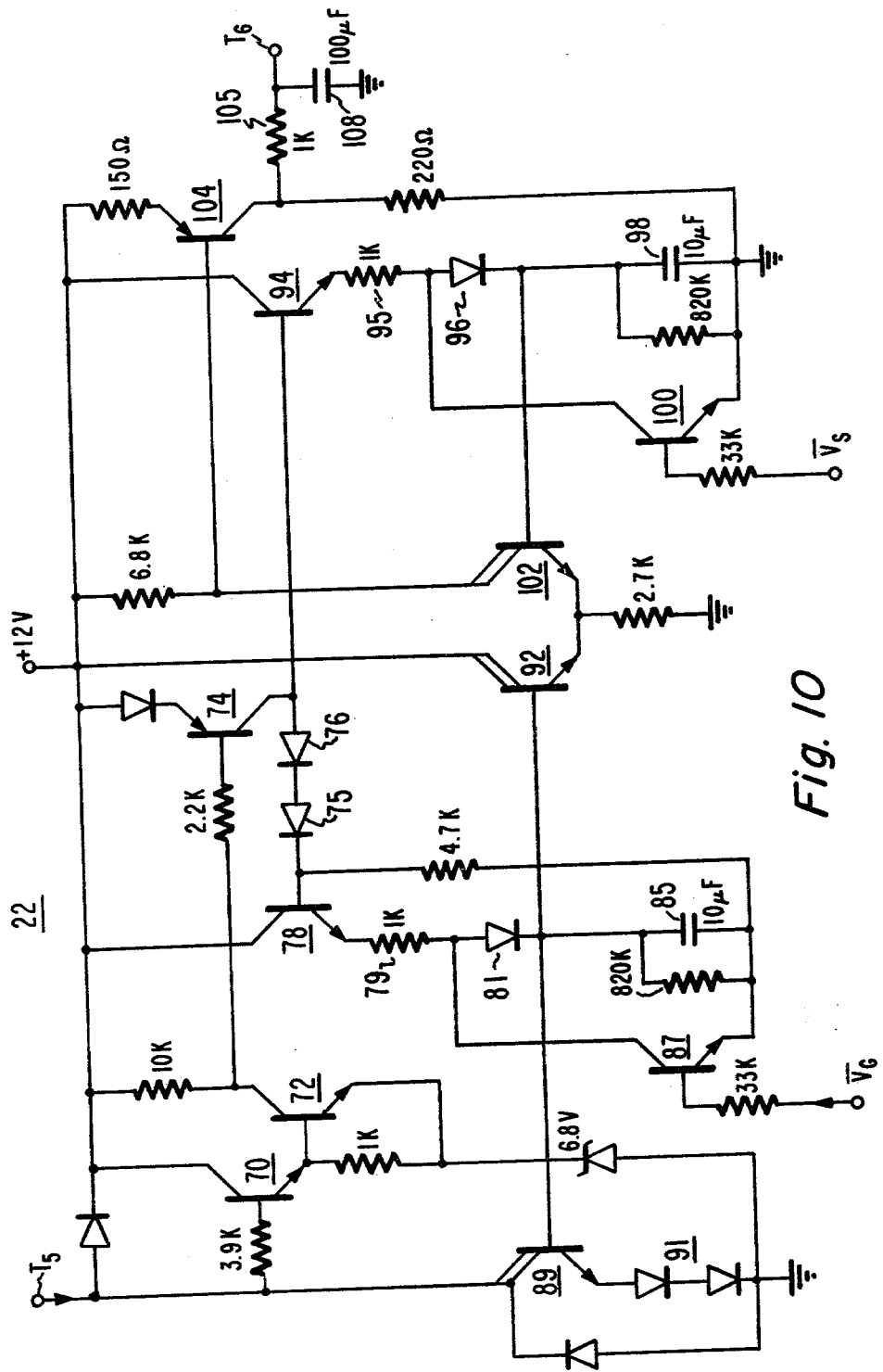

FIGS. 9 and 10 show circuit details of cathode signal processing network 14a (FIG. 1). Similar circuits are included in cathode signal processing networks 14b and 14c.

Consider FIG. 9, there is shown an arrangement of gate 20, which may comprise a transistor electronic switch, together with driver amplifier circuit 21. Signal r from matrix 12 is supplied to gate 20 via an input terminal $T_1$, and keying signals $V_A$ are supplied via a terminal $T_2$ to a control input of gate 20 (shown in the open position for the monitoring condition).

Driver 21 includes an amplifier comprising an amplifier transistor 54 and an active load circuit including a transistor 55. An input circuit coupled to a base input of transistor 54 comprises a frequency compensation network 50 including a gain adjustment variable resistor 51. Output video signals appear at an emitter of transistor 55 and are coupled to kinescope cathode 16a via an output circuit including an impedance network 60, an arc suppression resistor 62, and a terminal $T_3$. A voltage sensing voltage divider comprising resistors 65 and 66 is coupled between kinescope cathode 16a at terminal $T_3$ and a point of reference potential (+12 volts). Signal $V_G$ is applied to grid 18 of the kinescope via a resistor 68. A zener diode 58 coupled to an emitter of transistor 68. A zener diode 58 provides a reference bias voltage for transistors 54 and 55. In this example, the reference bias voltage provided by zener diode 58 is also applied via a terminal $T_4$ to corresponding amplifier circuits in cathode signal processing networks 14b and 14c.

With gate 20 open during the monitoring interval, the quiescent output level of driver 21 and thereby the voltage appearing at terminal $T_3$ are established at a reference level determined by zener diode 58 together with a bias network including resistors 52 and 57. An output voltage produced at the junction of voltage divider resistors 65 and 66 is coupled to the input of sampling amplifier 22 via a terminal $T_5$. A bias control voltage developed at the output of amplifier 22 is coupled via a terminal $T_6$ to resistor 57. This control voltage induces a correction current through resistor 57 to the base of transistor 54 such that the quiescent level appearing at the output of amplifier 21 and terminal $T_3$ is controlled in a direction to modify incorrect cathode blanking current levels toward the desired blanking level.

Figure 11:
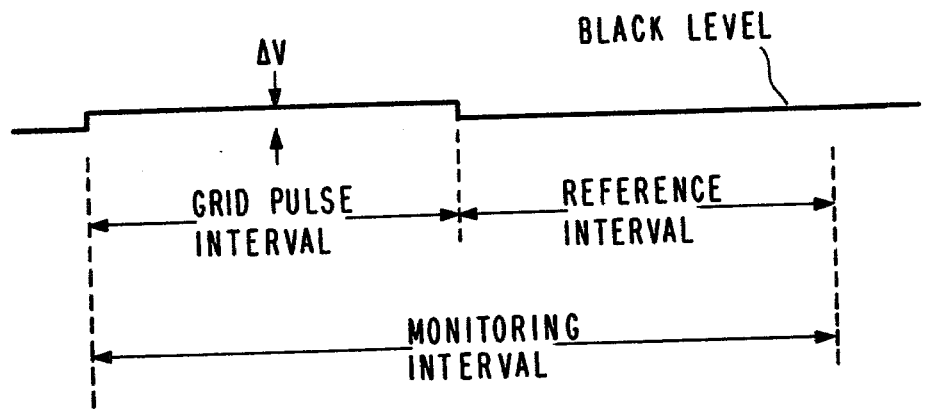
FIG. 11 depicts a signal waveform useful in understanding the operation of the arrangements in FIGS. 1, 9 and 10.

The cathode signal appearing at terminal $T_3$ is shown in pertinent part in FIG. 11. In the waveform of FIG. 11, a positive cathode output pulse induced by grid pulse $V_G$ during the grid pulse interval in the presence of excessive cathode blanking current is designed as $\Delta V$ (e.g., of the order of 100 millivolts). An attenutated version of this signal appears at the junction of voltage divider resistors 65 and 66 and is processed by sampling amplifier 22 as will be discussed below.

In this system, cathode blanking current correction is not influenced by cathode leakage currents (e.g, cathode-heater leakage currents), since the disclosed system does not directly measure the absolute value of very low level cathode currents in the vicinity of kinescope cutoff, which currents include a leakage component of unknown magnitude.

In this regard, it is noted that in the arrangement of FIG. 9 a current of approximately 2.7 milliamperes, including cathode blanking current, flows in voltage divider resistors 65, 66 during the entire monitoring interval. This current is determined by the voltage then developed across resistors 65, 66 (i.e., +180 volt cathode voltage minus the +12 volt reference voltage) divided by the value of these resistors. Therefore, the cathode blanking current of a few microamperes represents an insignificant portion of the current flowing in voltage divider 65, 66. During the grid pulse interval, a corresponding increase in cathode current is produced, together with an associated increase in the current flowing in voltage divider 65, 66. Therefore, a voltage developed across resistor 66 and at terminal $T_5$ is proportional to the difference in cathode current developed over the monitoring interval. Instead of measuring the absolute value of the very small cathode blanking current at a given point in time, the disclosed arrangement responds to the voltage difference produced across resistor 66. The level of the voltage increment produced in response to the grid pulse, and the level of the difference voltage, are not influenced by cathode leakage currents, since signal transfer from the kinescope control grid to the cathode is accomplished by beam current conduction via kinescope cathode follower action, uninfluenced by cathode-heater leakage currents. A more specific example follows.

In the absence of grid pulse $V_G$ during the monitoring interval, a very low cathode beam current ($i_{bL}$) is conducted by the kinescope. A higher current beam current ($i_{bH}$) is conducted in response to the grid pulse. The total current conducted by voltage divider 65, 66 in the absence and presence of the grid pulse consists of currents $i_{TL}$ and $i_{TH}$, respectively. These currents include a leakage component ($i_l$, approximately five microamperes), currents $i_{bL}$ and $i_{bH}$ noted above, and a quiescent current ($i_o$, approximately 2.6 milliamperes) supplied by the video driver amplifier, according to the following expressions:

$$i_{TL} = i_{bL} + i_l + i_o$$

$$i_{TH} = i_{bH} + i_l + i_o$$

The amplitude of the voltage appearing across voltage divider resistor 66 ($V_{66}$) over the monitoring interval is proportional to the value of resistor 66 ($R_{66}$) and the currents noted above according to the expression:

$$V_{66} = R_{66}(i_{TH} - i_{TL}) = R_{66}(i_{bH} - i_{bL}).$$

Therefore, the difference voltage developed across resistor 66 over the monitoring interval and as coupled to amplifier 22 is advantageously not influenced by current $i_o$ and leakage current $i_l$, and depends only on the cathode beam current difference ($i_{bH} - i_{bL}$). This current difference and therefore the level of the corresponding difference voltage ($V_{66}$) induced across resistor 66 become smaller as the cathode beam current approaches the desired blanking level in the vicinity of kinescope cutoff.

Although signal $V_G$ is to be applied to the control grid such as the commonly energized single control grid found in self-converging "in-line" kinescopes, the video drive signal can be applied either to the kinescope cathode as shown or to the control grid. The system as so far discussed substantially corresponds to that described in greater detail in my aforementioned copending U.S. patent application entitled, "Automatic Kinescope Biasing System."

FIG. 10 shows circuit details of sampling amplifier 22 in FIG. 1.

Sampling amplifier 22 comprises two identical sample and hold networks and an associated differential amplifier, for deriving a kinescope bias control voltage in accordance with the difference between the cathode output pulse level and the reference level. The first sampling network operates during the grid pulse interval when the cathode output pulse is developed, and the second sampling network operates during the subsequent reference interval. The time sequential sampling of the cathode voltage during the grid pulse and reference intervals, in combination with differential signal processing of the sampled information, provides significant rejection of interference signals such as line repetitive interferences associated with stray magnetic fields, for example.

The cathode output signal including induced cathode output pulse $\Delta V$ (FIG. 11) is coupled from voltage divider 65, 66 in FIG. 9 to the input of sampling amplifier 22 in FIG. 10 via terminal $T_5$. The input signal is buffered by an emitter follower transistor 70 and amplified by transistors 72 and 74. Diodes 75 and 76 impart a D.C. level shift to the amplified cathode pulse that is developed at the collector output of transistor 74 and processed by the first sample and hold network, comprising an emitter follower transistor 78, a resistor 79, a diode 81, a charge storage capacitor 85, and a transistor 87. Transistor 87 is rendered non-conductive in response to signal $\overline{V_G}$ during the grid pulse interval when the cathode output pulse appears, thereby permitting capacitor 85 to receive charge from transistor 78 proportional to the cathode pulse level. Transistor 87 is conductive at all other times, thereby reverse biasing diode 81 and isolating capacitor 85 from transistor 78.

The second sample and hold network comprises a transistor 94, a resistor 95, a diode 96, a storage capacitor 98, and a keyed transistor 100. This network is similar to the first sample and hold network (transistor 78, resistor 79, diode 81, capacitor 85, transistor 87) except that the second network operates subsequently during the reference interval. Transistor 100 is rendered non-conductive during the reference interval in response to signal $V_S$ to permit charging of capacitor 98 via transistor 94, resistor 95 and diode 96. Transistor 100 is conductive at all other times, whereby diode 96 is reverse biased to isolate capacitor 98 from transistor 94.

Emitter coupled (Darlington) transistors 92 and 102 form a differential amplifier with respective base electrodes coupled to capacitors 85 and 98 for sensing the voltage on these capacitors, and for developing an output voltage porportional to the difference in voltage on these capacitors. This output voltage appears in the collector output circuit of transistor 102, and also appears in inverted form at the collector output of a transistor 104 from which it is applied to the bias control input of amplifier 21 (FIG. 9) via a resistor 105 and terminal $T_6$. A capacitor 108 coupled to terminal $T_6$ provides phase compensation to avoid instability of the control loop comprising driver amplifier 21 and sampling amplifier 22.

The voltage stored on capacitor 85 in response to the level of the cathode pulse is sensed by a (Darlington) transistor 89 with a base input coupled to capacitor 85 and dual collector outputs coupled to the base input of input buffer transistor 70. Transistor 89 comprises a feedback clamp for stabilizing the input D.C. level at the base of transistor 70 such that the voltage developed on capacitor 85 is held substantially constant (i.e., clamped) at approximately +2.1 volts. This voltage corresponds to the base-emitter junction offset voltage of transistor 89 plus the offset voltages of diodes 91 in the emitter circuit of transistor 89. Transistor 89 with transistors 70, 72, 74 and 78 form a feedback clamping network to ensure that the linear signal processing range of the circuit including differential amplifier 92, 102 is not exceeded, and also permits very high amplification of the cathode output signal independent of the cathode D.C. level. In the latter regard it is noted that the cathode D.C. level depends upon the cut-off voltage of the kinescope electron gun. The cut-off voltage can vary from gun to gun within a given kinescope, and from one kinescope to another. It does not matter whether the feedback clamp fixes the cathode pulse level (as described above) or the reference level, since differential amplifier 92, 102 will provide a desired output voltage corresponding to the difference between these levels in either case.

When the kinescope is conducting excessive cathode blanking current, the level of the cathode output pulse increases accordingly, whereby the voltage developed on capacitor 85 likewise increases. This increase exceeds the +2.1 volt level that existed on capacitor 85 prior to the monitoring interval. The voltage on capacitor 98 remains unchanged initially.

The increased voltage on capacitor 85 is sensed by transistor 89, which then increases in conduction and lowers the D.C. base bias of input transistor 70, and thereby the voltage on capacitor 85 by feedback action, by an amount corresponding to the amount by which the cathode output pulse level has increased. During the subsequent reference interval, the reduced input D.C. bias corresponds to the reference level being D.C. shifted (decreased) by an amount equal to the increase in the cathode pulse level. The D.C. shifted reference level is then developed on and reduces the voltage on capacitor 98. Accordingly, the base bias of transistor 102 (via capacitor 98) is less than that of transistor 92 (via capacitor 85) by an amount proportional to the increased level of the cathode output pulse. The collector current of transistor 92 therefore exceeds that of transistor 102, whereby the collector output voltage of transistor 102 increases compared to the situation where the base voltages of transistors 92 and 102 are substantially equal. The collector output voltage of transistor 104 decreases in response to the increased collector voltage of transistor 102. The bias correction voltage as applied to amplifier 21 via terminal $T_6$ is in a direction to cause the D.C. output level of amplifier 21, and thereby cathode bias, to increase in a direction for reducing the level of cathode blanking current toward the desired level. The magnitude of the induced cathode output pulse then decreases a corresponding amount.

The collector voltage of transistor 104 continues to decrease until the difference between the cathode pulse level and the reference level (measured at the kinescope cathode) decreases to approximately thirty millivolts. This difference corresponds to a desired cathode blanking current condition for this system.

It is noted that locally generated intereference signals in television receivers are primarily line repetitive. The differential signal processing provided by differential amplifier 92, 102 results in considerable rejection of interference signals, particularly line repetitive interferences attributable to stray magnetic fields associated with the operation of power supply and deflection circuits in the receiver, such as can be induced in the wiring associated with the automatic kinescope biasing system. The cathode pulse and reference level sampling intervals are of equal duration, whereby any line repetitive interference affects both the sampled cathode pulse and sampled reference level information in the same manner and is suppressed by the common mode signal rejection characteristic of differential amplifier 92, 102.

The sampling intervals are sufficiently long so that sufficiently large storage capacitors can be used without increasing the time required to achieve correct kinescope biasing. A larger sampling time constant with attendant greater noise immunity also results.

The described differential signal processing also permits a rapid response to a change in the amplitude of the cathode output pulse relative to the reference level. Similar changes in the absolute value of the cathode pulse level and the reference level are essentially ignored by differential amplifier 92, 102 due to the common mode rejection characteristic of the differential amplifier. Therefore, it is not necessary to periodically re-reference the reference level of the cathode output pulse to a given D.C. level (e.g., by means of a clamping circuit with an associated time constant), whereby the bias correction voltage is derived from the amplitude of the cathode output pulse without unnecessary delay.

In this embodiment, it was assumed that the correct cathode blanking current level corresponds to a very small, non-zero level. Observations analogous to those above (when cathode current exceeds the desired level) also apply when the cathode blanking current is below the desired level. In this instance the correction signal applied from transistor 104 and terminal $T_6$ of network 22 to the bias control input of amplifier 21 will be in a direction to increase the cathode blanking current level until the desired current level is reached.

The thirty millivolt difference between the cathode output pulse level and the reference level produced when cathode bias is correct is a function of the signal gain provided by circuit 22 and the offset voltage introduced by diodes 75 and 76. This offset voltage ensures that bias correction occurs for a certain minimum voltage difference between the voltages developed on capacitors 85 and 98. Specifically, the level of the cathode output pulse as supplied to sampling circuit 22 from voltage divider 65, 66 is approximately +3.25 millivolts when correct biasing is achieved. The amplifier circuits including transistors 72 and 74 each provide a voltage gain of about twenty, which results in a cathode output pulse of about +1.3 volts being developed at the collector output of transistor 74. This voltage is substantially equal to the D.C. offset voltage provided by diodes 75 and 76 with respect to the signals processed by the first and second sampling networks. Increased sensitivity can be provided by eliminating diodes 75 and 76, but this will result in reduced immunity to interference signals that are not line repetitive.

Referring back to FIG. 9, it is noted that impedance network 60 serves to avoid excessive attenuation of the induced cathode output signal ($\Delta V$ in FIG. 11) by increasing the external cathode impedance. Such attenuation could otherwise occur, since the internal kinescope cathode impedance is relatively high, particularly at low cathode currents, while the output impedance of driver amplifier 21 is very low. The illustrated arrangement of impedance 60 permits an increased value of resistor 61 without an accompanying loss of signal bandwidth. The value of capacitor 63 is low enough to exhibit a high impedance at frequencies associated with the cathode drive signal. Other versions of impedance network 60 are described in my copending U.S. patent application mentioned previously.

Also in connection with FIG. 9, it was noted that the reference level developed during the reference interval is determined by the coaction of resistors 52, 57 and diode 58. However, this reference level could be established by other means, such as in response to a suitable reference level available from the video signals which would then be supplied to the kinescope drivers during the reference interval.

Figure 12:
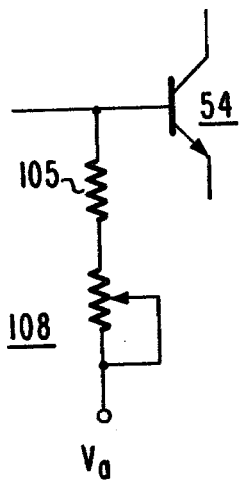
FIG. 12 shows a modified portion of the circuit in FIG. 10.

In some cases, it may be necessary to compensate for level shifts in the R, G, B cathode drive signal sources, or for differential D.C. level offsets. Compensation for these effects can be accomplished by modifying driver 21 as shown in FIG. 12 to include a resistor 105 and a variable resistor 108 between the base of amplifier transistor 54 and the source of signal $V_a$ (a reduced amplitude version of signal $V_A$, shown in FIG. 4). Offset compensation is accomplished by adjusting resistor 108 to add appropriate amounts of signal $V_a$ to the bias control input of amplifier 21 at the base of transistor 54.

What is claimed is:

1. In a system for processing an image representative video signal having periodically recurring image display intervals and image blanking intervals during which image information to be displayed is absent, said system including an image display kinescope having an electron gun with cathode and grid intensity control electrodes; means for coupling video signals to said kinescope electron gun; and apparatus for automatically controlling the level of blanking current conducted by said kinescope, comprising:

means for providing a reference bias voltage to said cathode electrode via a cathode current conduction path during a monitoring interval when said blanking current conduction of said kinescope is to be monitored, said monitoring interval encompassing a portion of said blanking interval;

means for providing an auxiliary signal to said grid electrode with a sense for forward biasing said grid electrode during one portion of said monitoring interval;

first means with an input coupled to said cathode current path and operative during said one portion of said monitoring interval for deriving a first signal proportional to the level of cathode current conducted in response to said auxiliary signal;

second means with an input coupled to said cathode current path and operative during another portion of said monitoring interval for deriving a second signal proportional to the level of cathode current conducted during said other portion of said monitoring interval;

differential amplifier means responsive to said first and second derived signals for providing an output control signal proportional to the difference in magnitude between said first and second derived signals, and thereby proportional to the difference between currents flowing in said cathode current path over said monitoring interval; and means for supplying said control signal to said video signal coupling means to modify the bias of said kinescope in a direction to adjust said signal difference to a level corresponding to a desired kinescope bias condition.

2. Apparatus according to claim 1, wherein:
said first and second deriving means operate during respective intervals of substantially equal duration during said monitoring interval.

3. Apparatus according to claim 2, wherein said first and second deriving means comprise similarly arranged sample and hold networks including:
first charge storage means;
first sampling means operable between relatively low and high impedance states for selectively coupling said first charge storage means to said cathode current path during said one portion of said monitoring interval to the exclusion of said other portion of said monitoring interval;
second charge storage means; and
second sampling means operable between relatively low and high impedance states for selectively coupling said second storage means to said cathode current path during said other portion of said monitoring interval to the exclusion of said one portion of said monitoring interval.

4. Apparatus according to claims 1, 2 or 3, wherein:
said inputs of said first and second deriving means are coupled to said cathode current path via a voltage responsive sensing network with an input coupled to said cathode current conduction path and an output coupled to said inputs of said first and second deriving means.

5. Apparatus according to claim 4, wherein:
said voltage responsive sensing network comprises a voltage divider network with an input first terminal coupled to said cathode electrode, an output second terminal coupled to said inputs of said first and second deriving means, and a third terminal coupled to a point of operating potential; and
said auxiliary signal comprises a voltage pulse.

6. Apparatus according to claim 1, wherein:
said video signal is supplied to said cathode electrode during intervals exclusive of said monitoring interval via said coupling means.

7. Apparatus according to claim 1, wherein:
said blanking interval comprises a vertical retrace interval; and
said monitoring interval occurs after said vertical retrace interval but before said image display interval.

8. In a television receiver for processing an image representative video signal having periodically recurring image display intervals and vertical and horizontal blanking intervals during which image information to be displayed is absent, said system including an image reproducing kinescope with an intensity control electron gun having cathode and grid electrodes; a video signal coupling path including a video amplifier for supplying an amplified video signal to said cathode electrode via a cathode current conduction path; and apparatus for automatically controlling the level of blanking current conducted by said kinescope, comprising:

means for providing a reference bias voltage to said cathode electrode via said cathode current conduction path during a monitoring interval when said blanking current conduction of said kinescope is to be monitored, said monitoring interval encompassing a portion of said vertical blanking interval;

means for providing an auxiliary signal to said grid electrode with a sense for forward biasing said grid electrode during one portion of said monitoring interval;

voltage responsive sensing means with an input coupled to said cathode electrode and an output, for developing at said output a voltage proportional to currents flowing in said cathode current conduction path over said monitoring interval;

first means coupled to said output of said sensing means and operative during said one portion of said monitoring interval for deriving a first voltage proportional to the level of cathode current conducted in response to said auxiliary signal;

second means coupled to said output of said sensing means and operative during another portion of said monitoring interval for deriving a second voltage proportional to the level of cathode current conducted during said other portion of said monitoring interval;

differential amplifier means responsive to said first and second derived voltages for providing an output control signal proportional to the difference in magnitude between said first and second derived voltages, and thereby proportional to the difference between currents flowing in said cathode current path over said monitoring interval; and means for supplying said control signal to said video signal coupling path, to modify the bias at said cathode electrode in a direction to adjust said signal difference to a level corresponding to a desired kinescope bias condition.

9. Apparatus according to claim 8, wherein:

said control signal is applied to said amplifier to modify the quiescent output level of said amplifier and thereby cathode electrode bias in a direction to adjust said signal difference to a level corresponding to a desired kinescope bias condition.

10. Apparatus according to claim 8, wherein:

said kinescope comprises plural cathode electrodes and an associated grid electrode energized in common with respect to said plural cathode electrodes.

11. Apparatus according to claims 8, 9 or 10, wherein said apparatus further comprises:

impedance means coupled between said amplifier and said cathode electrode, said impedance means exhibiting one value of impedance with respect to cathode signals during said monitoring interval, and a relatively lower value of impedance with respect to cathode signals at other times.

* * * * *